United States Patent
Hoffmann et al.

(10) Patent No.: US 9,290,659 B2
(45) Date of Patent: Mar. 22, 2016

(54) POLYAMIDE MOULDING MATERIALS CONTAINING CYCLOOLEFIN COPOLYMERS

(71) Applicant: EMS-PATENT AG, Domat/Ems (CH)

(72) Inventors: Botho Hoffmann, Domat/Ems (CH); Martin Suetterlin, Chur (CH); Sepp Bass, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 14/504,923

(22) Filed: Oct. 2, 2014

(65) Prior Publication Data

US 2015/0099846 A1    Apr. 9, 2015

(30) Foreign Application Priority Data

Oct. 3, 2013 (EP) ..................... 13187259
Jul. 17, 2014 (EP) ..................... 14177536

(51) Int. Cl.

| | |
|---|---|
| *C08L 77/04* | (2006.01) |
| *C08L 77/06* | (2006.01) |
| *C08L 45/00* | (2006.01) |
| *C09D 123/24* | (2006.01) |
| *C08F 232/04* | (2006.01) |
| *C09D 177/06* | (2006.01) |

(52) U.S. Cl.
CPC .............. *C08L 77/06* (2013.01); *C09D 177/06* (2013.01)

(58) Field of Classification Search
CPC ..... C08L 23/0823; C08L 77/06; C08L 23/24; C08L 45/00; C09D 123/0823; C09D 123/24; C09D 177/04; C09D 177/06
See application file for complete search history.

(56) References Cited

U.S. PATENT DOCUMENTS

| | | | | |
|---|---|---|---|---|
| 4,383,084 A | * | 5/1983 | Paschke | C08L 77/00 525/184 |
| 5,081,223 A | * | 1/1992 | Paschke et al. | 528/349 |
| 5,763,517 A | * | 6/1998 | Yamamoto et al. | 524/302 |
| 5,770,679 A | * | 6/1998 | Hayashi | C08L 77/00 524/504 |
| 6,007,520 A | * | 12/1999 | Sudo | A61J 1/10 264/496 |
| 2008/0154014 A1 | * | 6/2008 | Siemann | B29C 41/28 528/335 |
| 2013/0303367 A1 | * | 11/2013 | Oda et al. | 502/402 |

FOREIGN PATENT DOCUMENTS

| | | |
|---|---|---|
| DE | 203 060 | 10/1983 |
| JP | 07216149 A * | 8/1995 |
| JP | 2002012723 A * | 1/2002 |
| JP | 2011-057864 | 3/2011 |
| JP | 2011057864 A * | 3/2011 |
| WO | WO 2012090797 A1 * | 7/2012 |

OTHER PUBLICATIONS

Derwent Abstract of JP 2011-057864 (Acc. No. 2011-D06900, Mar. 2011, 3 pages).*
Derwent Abstract of DD 203060 (Acc. No. 1985-196943, Oct. 1983, 2 pages).*
Derwent Abstract of JP 2002-012723 (Acc. No. 2002-355770, Jan. 2002, 3 pages).*
Machine translated English language equivalent of JP 07-216149 (Aug. 1995, 8 pages).*
"TOBAS Cycloolefin Copolymer (COC)", COC manufacturer TOPAS Advanced Polymers, May 2007, PP. (In English and German).
European Search Report conducted in European Appln. No. 14177536.1-1306 (Sep. 5, 2014).

* cited by examiner

*Primary Examiner* — Brieann R Fink
(74) *Attorney, Agent, or Firm* — Greenblum & Bernstein, P.L.C.

(57) ABSTRACT

A transparent polyamide molding material containing at least one cycloolefin co-polymer comprises a mixture of:
(A) 55 to 99 wt % of at least one amorphous polyamide; and
(B) 1 to 30 wt % of the at least one cycloolefin copolymer,
Wherein, in the at least one cycloolefin copolymer (B), the cycloolefin fraction is more than 40 mol %. In this connection, the sum of the components (A) and (B) together with optional additives (C) is 100 wt % of the polyamide molding material.

21 Claims, No Drawings

POLYAMIDE MOULDING MATERIALS CONTAINING CYCLOOLEFIN COPOLYMERS

CROSS-REFERENCE TO RELATED APPLICATIONS

The present application claims priority under 35 U.S.C. §119(a) of European Patent Application No. 13 187 259.0 filed Oct. 3, 2013 and of European Patent Application No. 14 177 536.1 filed Jul. 17, 2014, the disclosures of which are expressly incorporated by reference herein in their entireties.

BACKGROUND OF THE INVENTION

1. Field of the Invention

The present invention relates to transparent polyamide moulding materials containing cycloolefin copolymers and the use thereof.

2. Discussion of Background Information

Polyamide moulding materials containing cycloolefin copolymers are known from patent specification DD 203 060 A. Thermoplastic combinations based on norbornene/ethylene copolymers and polyamides having approximately equal quantitative proportions of the two polymers are described there. As suitable polyamides mention is made of aliphatic polyamides, polyamides having cycloaliphatic chain building blocks, aliphatic-aromatic polyamides and/or aromatic polyamides, usually with specific compounds as an example. Transparency is not one of the requirements for the polyamide moulding materials described. The optical properties of those polyamide moulding materials are not disclosed.

JP 2011-057864 A discloses moulding materials which are based on cycloolefin copolymers as the main component and which contain a smaller quantity of an added aliphatic polyamide in relation thereto. The cycloolefin copolymers claimed there have a glass transition temperature Tg from 50° C. up to a maximum of 100° C. Aliphatic polyamides having a fraction of at least 50 mol % lactamic or aminocarboxylic acid units are used. The transparency of these compositions is only low since merely a visual contact transparency is given.

In the brochure "TOPAS Cycloolefin Copolymer (COC)" of the COC manufacturer TOPAS Advanced Polymers, May 2007 edition, cycloolefin copolymers are described more accurately as a copolymerization product of the bicyclic olefin norbornene and ethylene. The good compatibility of COC with polyolefins to produce blends is mentioned and it is explicitly pointed out that the addition of foreign also transparent thermoplastics to COC leads to severe opacity. The designation TOPAS is a registered trademark.

Compared with other thermoplastics, polyamides have the particular feature that according to the type, they can absorb a certain quantity of water from the ambient moisture, with the result that the volume or the dimensions of moulded parts or coatings fabricated therefrom or certain mechanical properties of the moulded parts or coatings fabricated therefrom can vary. This also applies to transparent polyamides.

In order to achieve a good dimensional stability and more constant mechanical properties it is desirable to keep the water absorption of a polyamide moulding material low. To this end, the polyamide can, for example, be mixed with other components. In the case of transparent polyamides however, these components usually have a negative influence on the optical properties, i.e. the light transmission and the haze (opacity) of the resulting polyamide moulding material.

SUMMARY OF THE EMBODIMENTS

Consequently it was the object of the present invention to provide a transparent polyamide moulding material based on a polyamide which shows a reduced water absorption compared with the unmodified polyamide and which despite the other moulding material components still has good optical properties, i.e. a high light transmission and a low haze.

This object is solved according to the present invention by a polyamide moulding material having the features of claim 1.

The transparent polyamide moulding material according to the invention contains a polyamide as the main component and contrary to the statement in the TOPAS brochure, i.e. to the complete surprise of the person skilled in the art, at least one cycloolefin copolymer.

At this point it should be pointed out that the term "polyamide" is a generic term which comprises homopolyamides and copolyamides as well as mixtures thereof. The notations and abbreviations for polymers and the monomers thereof are specified in the ISO Standard 1874-1:1992(E).

A transparent polyamide moulding material according to the invention containing at least one cycloolefin copolymer comprises a mixture of:
  (A) 55 to 99 wt % of at least one amorphous polyamide;
  (B) 1 to 30 wt % of the at least one cycloolefin copolymer, wherein in the at least one cycloolefin copolymer (B) the cycloolefin fraction is more than 40 mol %; and
  (C) 0 to 15 wt % of at least one additive;
wherein the sum of the components (A) to (C) is 100 wt % of the polyamide moulding material;
wherein this polyamide moulding material has a light transmission measured according to the ASTM D 1003 standard, which is at least 80%;
and wherein the polyamide moulding material has a haze measured according to the ASTM D 1003 standard, which is at most 30%.

The two said optical properties must be satisfied in order that a polyamide moulding material falls within the claimed range. If the polyamide moulding material contains no additive (C), the components (A) and (B) together yield 100 wt %. If an additive (C) is present, the sum of (A) and (B) is less than 100 wt % according to the fraction of component (C).

Preferred embodiments of the transparent polyamide moulding material according to the invention are obtained from the dependent claims. In addition, the use of this polyamide moulding material is claimed.

In differential scanning calorimetry, DSC, according to ISO 11357 at a heating rate of 20 K/min amorphous polyamides show a maximum heat of fusion of 5 J/g, preferably a maximum of 3 J/g, particularly preferably of 0 to 1 J/g.

In the polyamide moulding material according to the invention, components (A) and (B) are preferably present in a fraction of:
  (A) 60 to 97 wt % and (B) 3 to 25 wt %;
particularly preferably in a fraction of:
  (A) 62 to 96 wt % and (B) 4 to 23 wt %;
and quite particularly preferably in a fraction of:
  (A) 72 to 96 wt % and (B) 4 to 13 wt %.

Particularly preferably the at least one amorphous polyamide (A) contains at least one cycloaliphatic diamine, which is particularly preferably selected from a group consisting of bis(aminocyclohexyl)methane and its alkyl derivatives. The latter is understood to be bis(aminocyclohexyl)methane with alkyl substituents.

Quite particularly preferably the at least one cycloaliphatic diamine is selected from a group consisting of bis(4-amino-cyclohexyl)methane, bis(3-methyl-4-amino-cyclohexyl)methane and bis(3,5-dimethyl-4-amino-cyclohexyl)methane.

In a further preferred embodiment of the transparent polyamide moulding material according to the invention, in the at least one amorphous polyamide (A) hexamethylenediamine is excluded as a monomer and/or in the at least one cycloolefin copolymer (B) the cycloolefin fraction is preferably more than 40 mol %.

In a preferred embodiment the transparent polyamide moulding material according to the invention containing at least one cycloolefin copolymer comprises a mixture of:
- (A) 55 to 99 wt % of at least one amorphous polyamide, wherein in each case hexamethylenediamine is excluded as a monomer;
- (B) 1 to 30 wt % of at least one cycloolefin copolymer, wherein each cycloolefin copolymer has a cycloolefin fraction of more than 40 mol %; and
- (C) 0 to 15 wt % of at least one additive;

wherein the sum of components (A) to (C) is 100 wt % of the polyamide moulding material;
wherein this polyamide moulding material has a light transmission measured according to the ASTM D 1003 standard, which is at least 80%;
and wherein the polyamide moulding material has a haze measured according to the ASTM D 1003 standard, which is at most 30%.

The relative viscosity (RV) of the at least one amorphous polyamide (A) of the polyamide moulding material according to the invention is preferably 1.40 to 2.15, particularly preferably 1.45 to 1.85, and quite particularly preferably 1.50 to 1.75, measured using 0.5 g polyamide in 100 ml m-cresol at 20° C.

The at least one amorphous polyamide (A) of the polyamide moulding material according to the invention is preferably at least one amorphous copolyamide (A).

The amorphous copolyamide (A) preferably contains laurolactam as a monomer, and has a laurolactam content which is 10 to 45 mol %, particularly preferably 15 to 40 mol %, and quite particularly preferably 20 to 40 mol %, relative to the molar sum of all the monomers.

Preferably the amorphous copolyamide (A) contains the cycloaliphatic diamine bis(3-methyl-4-amino-cyclohexyl) methane (MACM) as a monomer. Particularly preferably the amorphous copolyamide (A) contains MACMI repetition units composed of bis(3-methyl-4-amino-cyclohexyl)methane (MACM) and isophthalic acid (I).

In a preferred embodiment the amorphous copolyamide (A) comprises a PA MACMI/12, composed of the monomers bis(3-methyl-4-amino-cyclohexyl)methane (MACM), isophthalic acid (I) and laurolactam (12). Especially preferably the PA MACMI/12 has the molar ratio 65/35.

In a further preferred embodiment the amorphous copolyamide (A) comprises a PA MACMI/MACMT/12, composed of the monomers bis(3-methyl-4-amino-cyclohexyl)methane (MACM), isophthalic acid (I), terephthalic acid (T) and laurolactam (12).

Among the PA MACMI/MACMT/12 those having an equimolar ratio of isophthalic acid to terephthalic acid are preferred. Especially preferably the PA MACMI/MACMT/12 has the molar ratio 38/38/24.

The at least one cycloolefin copolymer (B) is composed of at least one cyclic olefin and at least one linear or branched olefin, wherein the cycloolefin fraction in each case is more than 40 mol %, preferably 45 to 75 mol %, particularly preferably 47 to 70 mol % and quite particularly preferably 52 to 68 mol %. Preferred cyclic olefins are norbornene, substituted norbornenes, norbornene derivatives or tetracyclododecene. The substituents can comprise alkyl or aryl groups. Among the linear or branched olefins, linear olefins are preferred, in particular ethene and propene. One, two or more cycloolefin copolymers can be used. More than one cycloolefin copolymer is also present if the cycloolefin copolymers consist of the same monomers but the cycloolefin fraction differs quantitatively.

The at least one cycloolefin copolymer (B) has a glass transition temperature (Tg) which is preferably higher than 100° C. Particularly preferably the glass transition temperature of the at least one cycloolefin copolymer (B) lies in the range of 110° C. to 220° C., quite particularly preferably in the range of 120° C. to 210° C.

The at least one cycloolefin copolymer (B) has a cycloolefin fraction which is more than 40 mol % relative to the molar sum of all the monomers. Preferably the cycloolefin fraction of the cycloolefin copolymer is 43 to 75 mol %, particularly preferably 47 to 70 mol %, and quite particularly preferably 52 to 68 mol %.

The at least one cycloolefin copolymer (B) can contain functional groups which enhance its compatibility with the at least one amorphous polyamide (A). Suitable functional groups are, for example, acrylic acid, succinic acid anhydride, glycidylmethacrylate and/or maleic acid anhydride.

Preferably the at least one cycloolefin copolymer (B) consists of norbornene and/or norbornene derivatives and ethene.

Particularly preferably the at least one cycloolefin copolymer (B) consists of norbornene and ethene, and is therefore a norbornene/ethene copolymer.

In a preferred embodiment the transparent polyamide moulding material contains at least one additive (C). The fraction of the at least one additive (C) is preferably 0.1 to 6 wt %, particularly preferably 0.1 to 4 wt %. Preferably the quantity of an individual additive is no more than 3 wt %.

Preferably the at least one additive (C) is selected from the group consisting of stabilizers, lubricants, dyes, marking substances, compatibilizers, inorganic pigments, organic pigments, antistatics, antiblocking agents, release agents, demoulding agents, optical brighteners, photochromic additives, halogen-free flame retardants, metal pigments, metal flakes, metal-coated particles, fillers, nanoscale fillers and mixtures thereof.

Both the fillers and the nanoscale fillers can be surface-treated but also untreated. The nanoscale fillers preferably comprise minerals having a maximum particle size of 100 nm or natural or synthetic phyllosilicates or mixtures thereof. In the polyamide moulding materials according to the invention, for example, kaolins, serpentine, talc, mica, vermiculite, muscovite, illite, smectite, saponite, montmorillonite, hectorite, double hydroxides or mixtures thereof can be used.

The stabilizers preferably comprise organic or inorganic stabilizers which are selected from the group of antioxidants, antiozonants, sun protection agents, UV stabilizers, UV absorbers and UV blockers. In a preferred embodiment the transparent polyamide moulding material according to the invention contains at least one stabilizer as additive (C).

Polyamide moulding materials according to the invention have a light transmission which, measured according to the ASTM D 1003 standard, is at least 80%, preferably at least 85%, particularly preferably at least 88% and quite particularly preferably at least 90%. Polyamide moulding materials according to the invention additionally have a haze which, measured according to the ASTM D 1003 standard, is at most 30%, preferably at most 25%, particularly preferably at most 20% and quite particularly preferably at most 15%.

Transparent polyamide moulding materials according to the invention containing cycloolefin copolymer in which the at least one copolyamide (A) is a PA MACMI/12 show a water absorption measured on plates according to the ISO Standard 62 of less than 4 wt %. In the case of unmodified PA MACMI/12 the water absorption on the other hand is 4 wt %.

The polyamide moulding materials according to the invention preferably present in granular form can be used for coatings of objects or for manufacturing shaped bodies, in particular by extrusion or injection moulding.

The coatings or shaped bodies are primarily suitable for use in the fields of electrical and electronics, telecommunications, optics, photovoltaics and automobile interiors. The shaped bodies preferably comprise lenses, spectacle frames, spectacle rims, spectacle parts, viewing windows, visors, filter cups, flowmeters, closures, covers, instrument covers, buttons, housings or housing parts, in particular for portable electrical or electronic equipment. The coatings preferably comprise protective layers for example for displays, optical filters, functional or decorative parts in vehicle interiors or the front side of photovoltaic modules. Preferably the polyamide moulding materials according to the invention are used to produce shaped bodies by injection moulding.

DETAILED DESCRIPTION OF THE EMBODIMENTS

Production of a Polyamide Moulding Material According to the Invention

The following description of an exemplary production is used for illustration but is not intended to restrict the scope of the invention.

In order to produce the polyamide moulding material, the components are mixed (compounded) in the polymer melt on usual compounding machines such as, for example, single- or double-shaft extruders or screw kneaders. The components are metered individually into the entrance or added in the form of a dryblend. If additives are used, these can be introduced directly or in the form of a master batch. The carrier material of the master batch preferably comprises a polyolefin or a polyamide. Among the polyamides, PA 6, PA 11, PA 12, PA 6/12 or PA MACMI/12 are particularly suitable.

In order to produce the dryblend the dried granules and optionally other additives are mixed. This mixture is homogenized for 10-40 minutes by means of a tumble mixer, drum hoop mixer or tumble drier. In order to avoid absorption of moisture, this can take place under dried protective gas.

The compounding takes place at set cylinder temperatures of 230° C. to 295° C. Vacuum can be applied or atmospheric degassing can be carried out upstream of the nozzle. The melt is removed in strand form, cooled in a water bath at 10 to 80° C. and then granulated. The granular material is dried for 12 to 24 hours at 80 to 120° C. under nitrogen or dried in vacuum to a water content of less than 0.1 wt %. Preferably an underwater granulation or a hot-cut is used for the granulation.

Production of Test Specimens from the Polyamide Moulding Materials According to the Invention:

The test specimens were produced on an injection moulding machine from Arburg, Model Allrounder 420 C 1000-250. Ascending cylinder temperatures from 230° C. to 295° C. were used here. The moulding temperature was 80° C. Highly polished moulds were used for the plates for the measurement of the light transmission and the haze.

The test specimens were used in the dry state; to this end after the injection moulding they were stored for at least 48 h at room temperature in a dry environment, i.e. over silica gel.

The Measurements were Carried Out According to the Following Standards and on the Following Test Specimens:

Relative Viscosity (RV):
ISO 307
Granular material
0.5 g dissolved in 100 ml m-cresol
Measurement temperature 20° C.
Calculation of the relative viscosity (RV) according to $RV = t/t_0$ based on section 11 of the standard.

Flow Index MVR (Melt Volume Rate):
ISO 1133
Granular material
Measurement temperature 260° C.
Loading 2.16 kg
Indication in ml/10 min or $cm^3$/10 min Glass Transition Temperature (Tg) and Heat of Fusion:
ISO standard 11357
Granular material
Differential Scanning Calorimetry (DSC) was carried out at a heating rate of 20 K/min. The midpoint of the glass transition range which is given as the glass transition temperature (Tg) was determined by the "half height" method.

Water Absorption:
ISO 62
Plate, thickness 1 mm (100×100 mm)
Measurement temperature 23° C.
3-5 plates were stored in distilled water for 2880 hours and then the weight increase was determined. The value given is the arithmetic average of the measured weight increases (in wt %).

Light Transmission and Haze:
ASTM D 1003
Plate, thickness 2 mm (60×60 mm)
Measurement temperature 23° C.
Measuring device "Haze Gard plus" from Byk Gardner with CIE light type C. The light transmission and the haze value are given in % of the irradiated quantity of light.

Experiments:
For the experiments various polyamide moulding materials were compounded from the materials listed in the following Table 1. All the listed materials are transparent as a result of their amorphous structure (RV=relative viscosity).

TABLE 1

Materials used in the examples and comparative examples

| Material | Description | Manufacturer |
| --- | --- | --- |
| PA MACMI/12 | Amorphous polyamide MACMI/12 in the molar ratio 65/35 composed of bis(3-methyl-4-amino-cyclohexyl) methane, isophthalic acid and laurolactam RV 1.56 (measured using 0.5 g in 100 ml of m-cresol at 20° C.) Glass transition temperature 160° C. | EMS-CHEMIE AG, Switzerland |

TABLE 1-continued

Materials used in the examples and comparative examples

| Material | Description | Manufacturer |
| --- | --- | --- |
| PA 6I/6T MACMI/ MACMT/ PACMI/ PACMT/12 | Amorphous polyamide 6I/6T/MACMI/MACMT/PACMI/PACMT/12 composed of 1,6-hexanediamine (38.5 mol %), bis(3-methyl-4-amino-cyclohexyl)methane (7.5 mol %), bis(4-amino-cyclohexyl)methane (2.7 mol %), isophthalic acid (24.3 mol %), terephthalic acid (24.3 mol %) and laurolactam (2.7 mol %) RV 1.62 (measured using 0.5 g in 100 ml of m-cresol at 20° C.) Glass transition temperature 159° C. | EMS-CHEMIE AG, Switzerland |
| PA MACM12 | Amorphous polyamide MACM12 composed of bis(3-methyl-4-amino-cyclohexyl)methane and dodecanoic diacid RV 1.70 (measured using 0.5 g in 100 ml of m-cresol at 20° C.) Glass transition temperature 155° C. | EMS-CHEMIE AG, Switzerland |
| PA MACMI/ MACMT/12 | Amorphous polyamide MACMI/MACMT/12 in the molar ratio 38/38/24 composed of bis(3-methyl-4-amino-cyclohexyl)methane, isophthalic acid, terephthalic acid and laurolactam RV 1.54 (measured using 0.5 g in 100 ml of m-cresol at 20° C.) Glass transition temperature 190° C. | EMS-CHEMIE AG, Switzerland |
| Topas 5013 | Amorphous cycloolefin copolymer composed of ethene and norbornene, with a norbornene fraction of about 49 mol % Glass transition temperature 140° C. Flow index MVR (260° C., 2.16 kg, ISO 1133) 48 ml/10 min | TOPAS Advanced Polymers GmbH, Germany |
| Topas 6015 | Amorphous cycloolefin copolymer composed of ethene and norbornene, with a norbornene fraction of about 54 mol % Glass transition temperature 160° C. Flow index MVR (260° C., 2.16 kg, ISO 1133) 4 ml/10 min | TOPAS Advanced Polymers GmbH, Germany |
| Topas 6017 | Amorphous cycloolefin copolymer composed of ethene and norbornene, with a norbornene fraction of about 63 mol % Glass transition temperature 195° C. Flow index MVR (260° C., 2.16 kg, ISO 1133) 1.5 ml/10 min | TOPAS Advanced Polymers GmbH, Germany |
| Topas 8007 | Amorphous cycloolefin copolymer composed of ethene and norbornene, with a norbornene fraction of about 36 mol % Glass transition temperature 80° C. Flow index MVR (260° C., 2.16 kg, ISO 1133) 32 ml/10 min | TOPAS Advanced Polymers GmbH, Germany |
| Apel APL6015T | Amorphous cycloolefin copolymer composed of ethene and cycloolefin, with a cycloolefin fraction of about 43 mol % Glass transition temperature 145° C. Flow index MVR (260° C., 2.16 kg, ISO 1133) 9.6 ml/10 min | Mitsui Chemicals Inc., Japan |

The compositions of the polyamide moulding materials of the examples and comparative examples and the results of the measurements on the test specimens are given in the following Tables 2, 3 and 4. The quantitative fractions of the components are given in percentage by weight (wt %). The sum of the components used was in each case 100 wt % corresponding to the total weight of the polyamide moulding material.

TABLE 2

Compositions and measured values using PA MACMI/12

|  |  | Examples | | | | | | Comparative example |
| --- | --- | --- | --- | --- | --- | --- | --- | --- |
|  | Unit | 1 | 2 | 3 | 4 | 5 | 6 | 7 |
| PA MACMI/12 | wt % | 80 | 92.6 | 80 | 92.6 | 80 | — | 80 |
| PA MACMI/MACMT/12 | wt % | — | — | — | — | — | 88 | — |

TABLE 2-continued

Compositions and measured values using PA MACMI/12

| | Unit | Examples | | | | | | Comparative example |
| | | 1 | 2 | 3 | 4 | 5 | 6 | 7 |
|---|---|---|---|---|---|---|---|---|
| Topas 5013 | wt % | 20 | — | — | — | — | — | — |
| Topas 6015 | wt % | — | 7.4 | 20 | — | — | — | — |
| Topas 6017 | wt % | — | — | — | 7.4 | 20 | — | — |
| Apel APL6015T | wt % | — | — | — | — | — | 12 | — |
| Topas 8007 | wt % | — | — | — | — | — | — | 20 |
| Water absorption (23° C./water/2880 h) | wt % | 3.1 | 3.7 | 3.2 | 3.7 | 3.1 | 3.5 | 3.1 |
| Light transmission | % | 90.8 | 91.5 | 91.3 | 92.1 | 90.7 | 92.3 | 84.2 |
| Haze | % | 18 | 8 | 10 | 3 | 11 | 4 | 55 |

A copolyamide PA MACMI/12 was used as component (A) for Examples 1 to 5 according to the invention in Table 2. Norbornene/ethene copolymers with different norbornene fractions (Topas types, cf. also Table 1) were used as component (B) (cycloolefin copolymer). Examples 1 to 5 show very good optical properties both for the light transmission and for the haze and in addition show a reduced water absorption compared with the unmodified PA MACMI/12, the water absorption of which is 4.0 wt %.

Example 6 according to the invention, comprising a different amorphous polyamide (A), whose water absorption unmodified is 4 wt %, and another suitable cycloolefin copolymer (B) also shows very good optical properties.

It also follows from Table 2 that not every cycloolefin copolymer is suitable for the present invention. The comparative example 7 with Topas 8007 as norbornene/ethene copolymer (approx. 36 mol % norbornene, cf. Table 1) shows too high opacity as a result of the too-low cycloolefin fraction with a haze of 55%.

TABLE 3

Compositions and measured values of comparative examples with PA 6I/6T/MACMI/MACMT/PACMI/PACMT/12, containing hexamethylenediamine

| | Unit | Comparative examples | | | | | | | |
| | | 8 | 9 | 10 | 11 | 12 | 13 | 14 | 15 |
|---|---|---|---|---|---|---|---|---|---|
| PA 6I/6T/MACMI/MACMT/PACMI/PACMT/12 | wt % | 92.6 | 80 | 92.6 | 80 | 92.6 | 80 | 92.6 | 80 |
| Topas 5013 | wt % | 7.4 | 20 | — | — | — | — | — | — |
| Topas 6015 | wt % | — | — | 7.4 | 20 | — | — | — | — |
| Topas 6017 | wt % | — | — | — | — | 7.4 | 20 | — | — |
| Topas 8007 | wt % | — | — | — | — | — | — | 7.4 | 20 |
| Water absorption (23° C./water/2880 h) | wt % | 8.0 | 6.9 | 7.9 | 7.1 | 8.0 | 7.0 | 8.1 | 6.9 |
| Light transmission | % | 50.4 | 40.9 | 48.9 | 39.3 | 48.4 | 38.2 | 48.2 | 38.2 |
| Haze | % | 100 | 100 | 100 | 100 | 100 | 100 | 100 | 100 |

With PA 6I/6T/MACMI/MACMT/PACMI/PACMT/12 (containing hexamethylenediamine), the light transmission in Comparative Examples 8 to 15 is only between about 40 and 50%, and with a haze of 100% these mixtures are completely opaque. Such polyamide moulding materials are unsuitable for applications in which the optical properties of light transmission and haze are important.

The experiments in Tables 2 and 3 impressively show that both components (A) and (B) must be suitable so that the good optical properties according to the invention are achieved. The water absorption of the unmodified PA 6I/6T/MACMI/MACMT/PACMI/PACMT/12 is 8.8 wt %. In this abbreviation PACM stands for bis(4-amino-cyclohexyl) methane.

TABLE 4

Compositions and measured values of comparative examples with PA MACM12

| | Unit | Comparative examples | | | |
| | | 16 | 17 | 18 | 19 |
|---|---|---|---|---|---|
| PA MACM12 | wt % | 95 | 92.6 | 95 | 92.6 |
| Topas 6015 | wt % | 5 | 7.4 | — | — |
| Topas 6017 | wt % | — | — | 5 | 7.4 |
| Water absorption (23° C./water/2880 h) | wt % | 2.8 | 2.8 | 2.9 | 2.7 |
| Light transmission | % | 73.7 | 69.6 | 74.6 | 70.5 |
| Haze | % | 53 | 70 | 58 | 80 |

The Comparative Examples 16 to 19 from Table 4 with polyamide PA MACM12 show only a low light transmission between 70 and 75% and a high haze of 50 to 80%. Such polyamide moulding materials are unsuitable for applications in which the optical properties of light transmission and haze are important. The water absorption of the unmodified PA MACM12 is 3.0 wt %.

The examples and comparative examples of the experiments conducted are a good illustration and support for the features and limits of claim 1. With the present invention polyamide-COC mixtures can be provided which simultaneously meet the requirements of good optical properties and reduced water absorption.

What is claimed:

1. A polyamide moulding material containing at least one cycloolefin copolymer, the polyamide moulding material comprising:
    (A) 55 to 99 wt % of at least one amorphous polyamide;
    (B) 1 to 30 wt % of the at least one cycloolefin copolymer, wherein in the at least one cycloolefin copolymer (B) the cycloolefin fraction is more than 40 mol %; and
    (C) 0 to 15 wt % of at least one additive;
    wherein the sum of the components (A) to (C) is 100 wt % of the polyamide moulding material;
    wherein the polyamide moulding material has a light transmission measured according to the ASTM D 1003 standard, which is at least 80%; and
    wherein the polyamide moulding material has a haze measured according to the ASTM D 1003 standard, which is at most 30%.

2. The polyamide moulding material according to claim 1, wherein the components (A) and (B) are present in a fraction of:
    (A) 60 to 97 wt % and (B) 3 to 25 wt %.

3. The polyamide moulding material according to claim 1, wherein the at least one amorphous polyamide (A) contains at least one cycloaliphatic diamine.

4. The polyamide moulding material according to claim 3, wherein the at least one cycloaliphatic diamine is selected from the group consisting of bis(aminocyclohexyl)methane and its alkyl derivatives.

5. The polyamide moulding material according to claim 3, wherein the at least one cycloaliphatic diamine is selected from the group consisting of bis(4-amino-cyclohexyl)methane, bis(3-methyl-4-amino-cyclohexyl)methane and bis(3,5-dimethyl-4-amino-cyclohexyl)methane.

6. The polyamide moulding material according to claim 1, wherein, in the at least one amorphous polyamide (A), hexamethylenediamine is excluded as a monomer.

7. The polyamide moulding material according to claim 1, wherein the at least one amorphous polyamide (A) is at least one amorphous copolyamide (A).

8. The polyamide moulding material according to claim 7, wherein the at least one amorphous copolyamide (A) is a copolyamide containing bis(3-methyl-4-amino-cyclohexyl)methane and isophthalic acid.

9. The polyamide moulding material according to claim 8, wherein the at least one amorphous copolyamide (A) is a copolyamide composed of bis(3-methyl-4-amino-cyclohexyl)methane, isophthalic acid and laurolactam.

10. The polyamide moulding material according to claim 8, wherein the at least one amorphous copolyamide (A) is a copolyamide composed of bis(3-methyl-4-amino-cyclohexyl)methane, isophthalic acid, terephthalic acid and laurolactam.

11. The polyamide moulding material according to claim 7, wherein the amorphous copolyamide (A) contains laurolactam and has a laurolactam content which is 10 to 45 mol %, relative to the molar sum of all monomers.

12. The polyamide moulding material according to claim 1, wherein the at least one cycloolefin copolymer (B) has a cycloolefin fraction of 43 to 75 mol %.

13. The polyamide moulding material according to claim 1, wherein the at least one cycloolefin copolymer (B) has a glass transition temperature which is higher than 100° C.

14. The polyamide moulding material according to claim 1, wherein the at least one cycloolefin copolymer (B) consists of norbornene and/or norbornene derivatives and ethene.

15. The polyamide moulding material according to claim 1, wherein the fraction of the at least one additive (C) is 0.1 to 6 wt %.

16. The polyamide moulding material according to claim 1, wherein the at least one additive (C) is selected from the group consisting of stabilizers, lubricants, dyes, marking substances, compatibilizers, inorganic pigments, organic pigments, antistatics, antiblocking agents, release agents, demoulding agents, optical brighteners, photochromic additives, halogen-free flame retardants, metal pigments, metal flakes, metal-coated particles, fillers, nanoscale fillers and mixtures thereof.

17. The polyamide moulding material according to claim 16, wherein the at least one additive (C) comprises a stabilizer.

18. The polyamide moulding material according to claim 9, wherein the polyamide moulding material has a water absorption measured on plates according to the ISO Standard 62 of less than 4 wt %.

19. The polyamide moulding material according to claim 1, wherein the polyamide moulding material has a light transmission measured according to the ASTM D 1003 standard which is at least 85%.

20. The polyamide moulding material according to claim 1, wherein the polyamide moulding material has a haze measured according to the ASTM D 1003 standard which is at most 25%.

21. A shaped body or a coating for an object produced from a polyamide moulding material according to claim 1.

* * * * *